Jan. 3, 1933.   R. R. RIDGWAY   1,893,106
METHOD OF AND APPARATUS FOR ELECTRICALLY FUSING NONCONDUCTING MATERIALS
Filed May 14, 1930
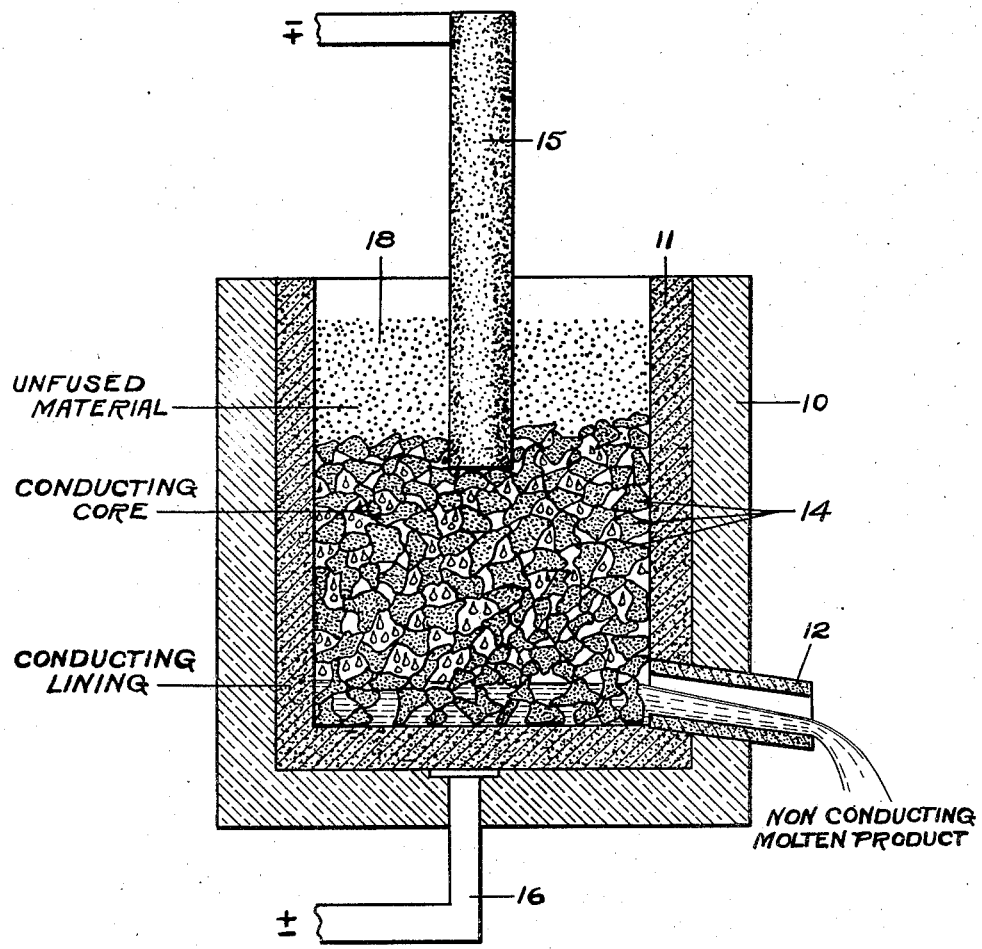
Inventor
RAYMOND R. RIDGWAY
By Clayton R. Jenks
Attorney Patented Jan. 3, 1933

1,893,106

UNITED STATES PATENT OFFICE

RAYMOND RONALD RIDGWAY, OF NIAGARA FALLS, NEW YORK, ASSIGNOR TO NORTON COMPANY, OF WORCESTER, MASSACHUSETTS, A CORPORATION OF MASSACHUSETTS

METHOD OF AND APPARATUS FOR ELECTRICALLY FUSING NONCONDUCTING MATERIALS

Application filed May 14, 1930. Serial No. 452,511.

This invention relates to a method of and an apparatus for electrically fusing a non-conducting material.

Such materials as alumina may be fused in a crucible by passing an electric current between electrodes directly through the molten product because the melt is a conductor of electricity; but if the fused material is a poor conductor, it is not practical to employ such a method and the material must be melted by some indirect application of heat. There are materials which require high electric furnace temperatures for their treatment, and if they are not electrical conductors, a problem is often met in the attempt to use electric furnace methods. For example, boric acid will melt in its water of crystallization to produce a partially dehydrated acid but it is necessary to raise the temperature to the neighborhood of 850° to 1000° C. before a completely anhydrous boron oxide is obtained. Boron oxide in the fused and anhydrous condition will not conduct electricity, hence it cannot be melted in accordance with the standard practice in which a current is passed directly through the molten bath. If this boric acid is melted in a refractory container by the application of heat to the outside of the container, the molten glass will dissolve a portion of the container at each charge and so both contaminate the glass and destroy the container. If this container is a pure graphite crucible and it is heated externally by a gas or coal flame this crucible will oxidize fairly rapidly at the temperature of 1000° C. required to melt the boric acid. It is not feasible, moreover, to raise the voltage to a sufficiently high point to cause an electric current to pass directly through the molten boron oxide glass without objectionable arcing developing. For example, I have found that an arc will play across a five-inch hot carbon gap in the space above molten boron oxide rather than travel through the fused material.

It is accordingly the primary object of my invention to provide a method of fusing a material which is a poor conductor of electricity when in the molten state, and particularly such a method which may be easily controlled and economically and satisfactorily operated to produce the desired results.

A further object of this invention is to provide a method of melting or dehydrating a material which is a non-conductor of electricity in the molten state, and to obtain a product which is free from serious contamination by the walls of the container.

A further object of the invention is to provide a method of converting boric acid to an anhydrous oxide without loss of boron by volatilization or without reduction of the glass or other detrimental effects taking place.

A further object is to provide an electrical apparatus which will accomplish the desired results as above described. Further objects will be apparent in the following disclosure.

In accordance with my invention, I propose to melt a material which is a poor conductor of electricity when in the molten state by placing it in juxtaposition to and preferably on top of a core made up of large size particles of crushed electrically conducting material, such as graphite or carbon, and to pass an electric current through this core from one electrode to another and generate heat which melts the material and causes it to drain off in the molten state through or around the core. It is well known that a carbon or graphite resistor core may have the particles of such size and relationship that it will attain a resistance at a given temperature which is such that the power may be maintained substantially constant under reasonable electrical conditions provided the heat is absorbed at the rate at which it is supplied. For example, a core composed of one-quarter inch particles of graphite arranged in a cylindrical shape 28 inches long and 4 inches in diameter will consume 50 kilowatts at 1000° C. with a voltage of about 110 volts. If, now, the material to be melted is charged directly onto this hot carbon it will be melted and will drain through the core without reacting with it, if the temperature is maintained at the proper value. This process is particularly applicable to the dehydration of boric acid, which is $H_3BO_3$, and by means of this process I may obtain a quite pure boron oxide from which the water of crystallization has been removed and which is not contaminated with undesirable materials derived from the non-reactive container or the carbon resistor. In this process, the steam is prevented from reacting with and consuming the carbon of the core and crucible by the molten boron oxide which coats and protects the carbon.

Referring more particularly to the drawing which illustrates one embodiment of an apparatus designed to carry out this process, I have there illustrated a crucible 10 made of suitable non-conducting and heat insulating material, such as bricks and other materials well known in the art, and this container is lined with a graphite lining 11 which will serve as a conductor of electricity. A spout 12 located near the bottom of the crucible will serve for drawing off any molten material formed during the process. In order to form the electrical resistor core I utilize particles of graphite or carbon 14, the size of which is determined in accordance with the conditions to be obtained in the furnace as is well known in the art. These resistor particles are placed in the crucible in quantity sufficient to partially fill the same and form the heating core but leave room for the material to be melted. In order to pass an electric current through this bed of carbon particles, I utilize an electrode 15 which is suitably suspended in contact with the upper portion of the particles and a further electrode 16 makes contact, as illustrated, with the graphite lining of the crucible. When a current is passed between the two electrodes 15 and 16, it will pass from these electrodes through the particles and the graphite lining 11, and it will be appreciated that if the electrode 15 is spaced at a greater distance from the electrode 16 than it is from the graphite lining 11 a considerable portion of the electricity will travel between the electrode 15 and the side walls of the graphite lining and thus produce the hottest zone at the upper end of the crucible.

If now the material to be melted, such as boric acid, is charged onto the top of the carbon particles and a suitable electrical power input is applied to the electrodes to produce a temperature of approximately 850° to 1000° C., then the heat generated by the current passing through the carbon particles will gradually melt the layer 18 of boric acid and cause it to drain downwardly through the carbon and to escape through the spout 12 at the bottom of the crucible. The steam which is given off by the boric acid as it is dehydrated will rise through the charge 18 of boric acid and transfer its heat thereto. The temperature of the reaction is, of course, kept far below that at which the boron oxide is caused to combine with the carbon and consequently the material will drain through the carbon particles without absorbing carbon therefrom, and since it will not contact with any other material but carbon it will escape from the crucible without being contaminated to any extent.

It will be apparent that this process may be run continuously if fresh material is charged continuously or at desired intervals onto the top of the resistor core, so that the molten material may be withdrawn continuously from the electric furnace. For certain cases it is of course feasible to have the process intermittent and to retain the molten material in the bottom of the crucible.

It will be understood from the above explanation that the nature of the resistance core may be varied in accordance with the nature of the material to be melted, so that the latter may not be contaminated or otherwise affected by the material making up this core. Also the power input, temperature conditions and the like will be varied in accordance with the material which is being treated, as is well known by those skilled in the electrochemical art. The molten material drains through the resistor core and serves to maintain an even temperature distribution in the crucible and to transfer the heat input into the product with the highest degree of efficiency. Various applications of this process to many arts will be readily appreciated in view of the above disclosure.

Having thus described my invention, what I claim as new and desire to secure by Letters Patent is:

1. The method of electrically fusing a material which is a poor conductor of electricity in the liquid state comprising the steps of providing a stationary granular carbon resistance core located around an electrode in a crucible lined wholly with a carbon conductor, passing an electric current between the crucible and electrode while maintaining a power input which will attain the desired temperature conditions, charging the material to be melted onto the top of the core whereby it is melted and caused to drain downwardly through the core and continuously withdrawing the molten material from the heated zone, the material being treated being caused to contact only with carbon within the furnace.

2. The method of producing boron oxide from boric acid comprising the steps of charging the boric acid onto a stationary bed of granular carbon particles in a non-reactive container, passing an electric current through the carbon bed to attain a temperature of 850° to 1000° C. and supplying fresh boric acid to the top of the bed in the container while causing the molten material to drain through the bed and escape from the heated zone, the boron compounds contacting only with non-reactive material during the process.

3. An electric melting furnace comprising a container, the inner surface of which is made wholly of carbon, a carbon electrode suspended within the container, a second conductor of electricity connected with said lining whereby electricity may be passed from the electrode to the lining, a stationary core of carbon particles placed in contact with said electrode and said lining, said parts being adapted to attain a desired temperature condition and said container having space above the core whereby the material to be melted may be charged directly thereon and the heat generated by the electrical resistance core may melt said material and cause it to drain downwardly through the core in a molten condition, and means whereby said molten material may be withdrawn from the container.

4. The method of electrically melting and dehydrating a hydrated substance which is a non-conductor of electricity when molten, comprising the steps of placing a granular carbon resistance core within a vessel which is wholly lined with carbon in the reactive zone and in which the melted material contacts only with carbon, charging the hydrated substance onto the top of said core, passing an electric current through the core, while maintaining a power input which will provide the required temperature for melting and dehydrating the compound without causing reaction between the core and said compound, and causing the molten, dehydrated material to drain downwardly through the core particles and the steam to pass upwardly therethrough.

5. The method of producing boron oxide of high purity from boric acid comprising the steps of placing a stationary, granular carbon resistance core within a vessel which is wholly lined in the reactive zone with carbon and in which the boron oxide contacts only with carbon, charging the boric acid onto the top of said carbon core, passing an electric current through the core, while maintaining a power input which will provide a temperature between 850° C. and 1000° C. and cause the boric acid to be melted and dehydrated, and causing the molten boron oxide to drain downwardly through the core and to coat the core particles and prevent the steam which passes upwardly therethrough from contacting and reacting with the core, thus producing boron oxide which is uncontaminated with materials other than carbonaceous.

Signed at Niagara Falls, New York, this 8th day of May, 1930.

RAYMOND R. RIDGWAY.